(12) United States Patent
Norwood et al.

(10) Patent No.: US 10,656,064 B2
(45) Date of Patent: May 19, 2020

(54) QUANTIFYING FORCE MANAGEMENT SYSTEM FOR PRESSURIZED FLUID DENSITY BALANCE

(71) Applicants: John D. Norwood, Houston, TX (US); Virgilio Go Boncan, Houston, TX (US); Kevin Madsen, Houston, TX (US); Adam Olson, Houston, TX (US)

(72) Inventors: John D. Norwood, Houston, TX (US); Virgilio Go Boncan, Houston, TX (US); Kevin Madsen, Houston, TX (US); Adam Olson, Houston, TX (US)

(73) Assignee: OFI Testing Equipment, Inc., Houston, TX (US)

( * ) Notice: Subject to any disclaimer, the term of this patent is extended or adjusted under 35 U.S.C. 154(b) by 219 days.

(21) Appl. No.: 15/986,608

(22) Filed: May 22, 2018

(65) Prior Publication Data

US 2018/0340875 A1 Nov. 29, 2018

Related U.S. Application Data

(60) Provisional application No. 62/510,597, filed on May 24, 2017.

(51) Int. Cl.
| | |
|---|---|
| *G01N 9/04* | (2006.01) |
| *F04B 51/00* | (2006.01) |
| *F04B 19/22* | (2006.01) |
| *E21B 41/00* | (2006.01) |
| *F04B 9/14* | (2006.01) |
| *G01N 9/02* | (2006.01) |

(52) U.S. Cl.
CPC ............... *G01N 9/04* (2013.01); *E21B 41/00* (2013.01); *F04B 9/14* (2013.01); *F04B 19/22* (2013.01); *F04B 51/00* (2013.01); *G01N 9/02* (2013.01)

(58) Field of Classification Search
CPC .................................. G01N 9/04; G01N 9/02
See application file for complete search history.

(56) References Cited

U.S. PATENT DOCUMENTS

| | | |
|---|---|---|
| 2,132,736 A | 10/1938 | Jones |
| 3,747,415 A | 7/1973 | Nickles et al. |
| (Continued) | | |

*Primary Examiner* — Helen C Kwok
(74) *Attorney, Agent, or Firm* — Keeling Law, LLC; Kenneth A. Keeling; Mark S. Solomon

(57) ABSTRACT

Embodiments of a quantifying force management system generally include a force applicator, a force indicator, and a force application assembly that includes a housing having an internal bore, a housing cap, and a force translator. In various embodiments, a portion of the force applicator extends through a housing cap opening wherein a force applicator bottom surface contacts a force translator top surface within the housing bore and whereby upon application of longitudinal force via the force applicator the force translator is compressed, and wherein the force indicator indicates the quantity of force being applied. In one aspect, embodiments of the quantifying force management system are incorporated in a piston assembly for use with a pressurized fluid density balance. A method of using the quantifying force management system, as a component of the piston assembly, in measuring the density of a liquid sample utilizing a fluid density balance is also provided.

20 Claims, 10 Drawing Sheets

(56) References Cited

U.S. PATENT DOCUMENTS

| | | | |
|---|---|---|---|
| 4,321,829 A * | 3/1982 | Cain | ........................ G01N 9/02 |
| | | | 73/433 |
| 4,374,474 A | 2/1983 | Cain | |
| 5,608,157 A * | 3/1997 | Orr | ........................ G01F 17/00 |
| | | | 73/149 |
| 5,703,278 A | 12/1997 | Murphy, Jr. et al. | |

* cited by examiner

QUANTIFYING FORCE MANAGEMENT SYSTEM FOR PRESSURIZED FLUID DENSITY BALANCE

CROSS-REFERENCE TO RELATED APPLICATIONS

This application claims the benefit of U.S. Provisional Application No. 62/510,597 filed on May 24, 2017, which application is incorporated herein by reference as if reproduced in full below.

STATEMENT REGARDING FEDERALLY SPONSORED RESEARCH OR DEVELOPMENT

Not applicable.

BACKGROUND OF THE INVENTION

Field of the Invention

The present invention generally relates to an improved apparatus for measuring the density of liquids, such as drilling fluids.

Description of the Related Art

In the oil and gas industry, it is necessary to understand the properties of materials used during subterranean exploration. Many such materials are liquids formulated at the surface and then provided downhole. Included in the assortment of liquids utilized in downhole operations are drilling fluids ("muds"), cement slurries, and cement spacer fluids. An industry desired property to be quantified for many such liquids is density. The density of the liquid determines the hydrostatic pressure it will exert at a particular depth. Inaccurate fluid density measurement, in the laboratory or at the well site, can lead to problems in the wellbore.

The prior art includes apparatuses and methods for measuring the density of liquids. For example, U.S. Pat. No. 2,132,736, to Jones, discloses a drilling fluid tester scale. Disclosed in U.S. Pat. No. 3,747,415, to Nickles, et al., is a method and apparatus for measuring absolute densities under pressure, wherein the apparatus includes a sample cup, a sealing cap with a valve therein through which the cup can be charged with fluid to be measured, a pressure pump, and a weighing device with which the cup is charged and weighed. U.S. Pat. No. 4,374,474, to Cain, describes a fluid density measuring apparatus for measuring the density of a fluid in a pressurized state, the apparatus including a balance arm, a fulcrum for supporting the balance arm, a balance weight slidably disposed on the balance arm, and a pressurizable container disposed on the balance arm for holding a fluid sample, wherein a valve is connected to the pressurizable container for allowing pressurized fluid to flow into the container and for retaining the fluid in the container under pressure, and wherein a pump, which includes a pump body having a cylindrical bore disposed therein, an outlet port for communicating the bore with the valve, and a rotatable piston member threadedly engaged with the pump body for pressurizing fluid contained in the bore of the pump body upon rotation of the piston member relative to the pump body, is provided for supplying pressurized fluid to the valve. U.S. Pat. No. 5,703,278, to Murphy, Jr., et al., teaches a pressurized fluid density balance provided by modifying an atmospheric pressure fluid density measurement device. Each of the above-listed prior art patents is incorporated herein by reference in its entirety.

A pressurized fluid density balance, such as the Pressurized fluid Density Scale available from OFI Testing Equipment, Inc. of Houston, Tex., as the Model 100-70, is utilized industry-wide in density testing of, for example, cement slurries. The American Petroleum Institute (API), in its publication RP10B-2, which is incorporated herein by reference in its entirety, provides that such a device is the preferred apparatus for measuring the density of a cement slurry.

The usage of pressurized devices for fluid density measurement may reduce certain testing errors. For example, during formulation of the drilling liquids, and/or during density measurement sample preparation, gas bubbles (typically air) may be unintentionally trapped (entrained) in the liquid to be tested. As gasses are compressible, a force (pressure) applied to a sample containing gas bubbles can minimize the fraction of the sample volume which comprises gas. Since density is a measurement of mass per unit of volume, the sample's volume is part of the density calculation, and a reduction in the liquid sample gas content volume provides a more accurate determination of sample liquid density. Importantly however, variations in the amount of force applied to compress such bubbles can result in variation in density measurements from test to test, and from tester to tester. Thus, while use of pressurized devices to measure density minimizes the quantity of air bubbles contained within a sample during testing, a lack of available means of quantifying the pressure exerted on the liquid sample during testing imparts a lack of precision on density testing results.

It is an objective of the present invention to provide a mechanism for quantifying the amount of pressure applied to the sample during the fluid density measurement process.

BRIEF SUMMARY OF THE INVENTION

Embodiments of the invention generally include a modified piston assembly comprising a pump assembly and a force management system comprising a force applicator, such as a piston-post, a force indicator, such as one or more markings circumferentially etched onto the surface of a segment of the piston-post, and a force application assembly comprising a housing comprising an internal bore, a compressible force translator, such as a coil spring, disposed within the internal bore, and a housing cap. In various embodiments, the force management system quantifies the amount of force applied via the piston assembly. Embodiments of a method of utilizing the piston assembly, in cooperation with a fluid density balance, to measure the density of a liquid sample are also provided.

Other features and advantages of the invention will be apparent from the following description, the accompanying drawings, and the appended claims.

DETAILED DESCRIPTION OF EXEMPLARY EMBODIMENTS OF THE INVENTION

Figure 1:
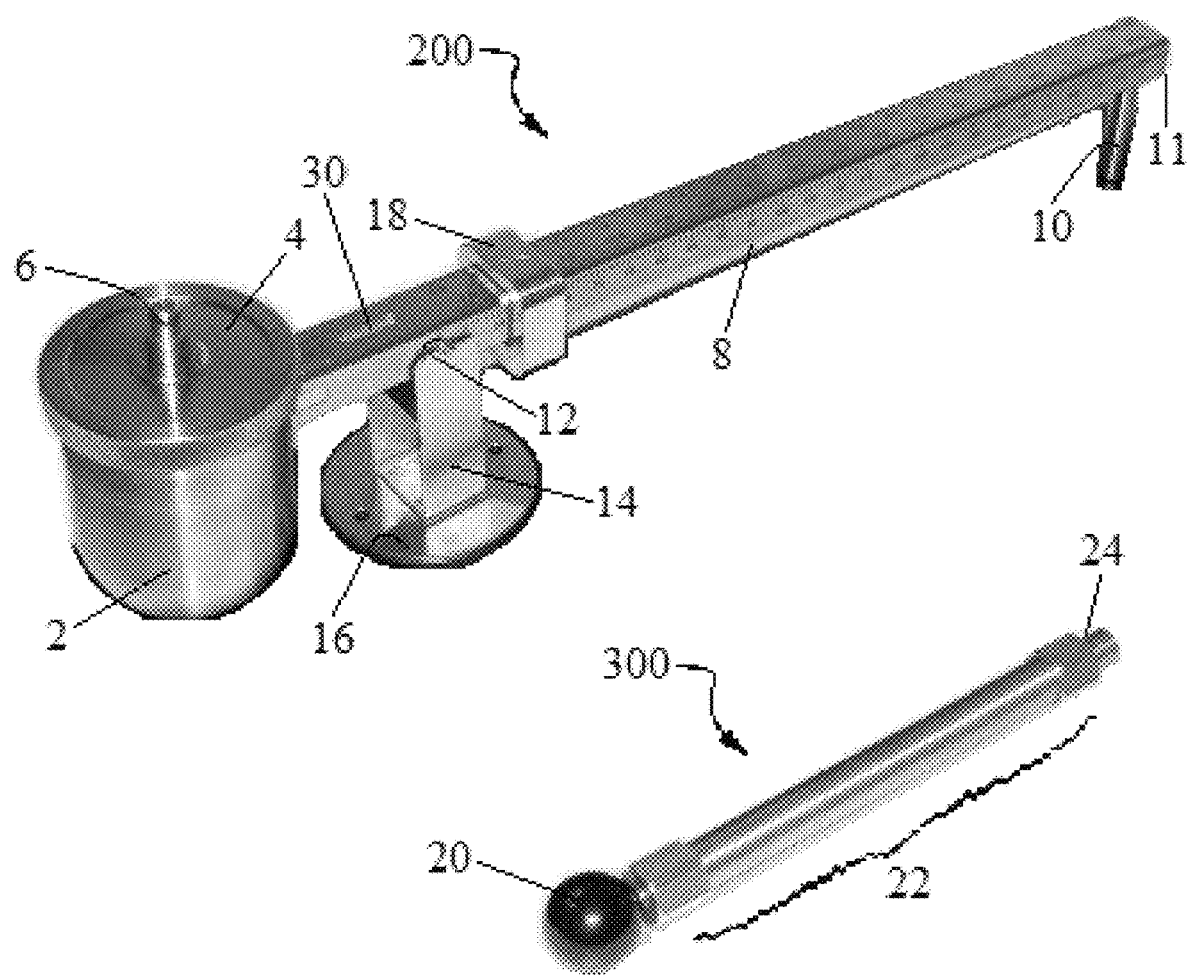
FIG. 1 is a depiction of a prior art pressurized mud balance and prior art piston assembly.

The exemplary embodiments are best understood by referring to the drawings wherein like reference characters designate like or similar parts throughout. As used herein, relative direction terms such as "top," bottom," "up," and "down" are used only for descriptive purposes in illustrating exemplary embodiments, and other geometries and/or orientations are contemplated. While the art encompasses non-pressurized as well as pressurized fluid density (mud) balances, for simplicity, embodiments of pressurized fluid density balances of the present invention described below are generally referred to as a "mud balance."

FIG. 1 depicts an embodiment of a mud balance 200 and prior art piston assembly 300 employable therewith, as are generally known in the art. In one embodiment, a mud balance 200 comprises a sample cup 2, a sample cup lid assembly 4, a sample cup lid connection component 6, an elongated lever 8, a lever balance adjuster 10, a pivot component 12, a fulcrum component 14, a fulcrum support 16, and a slidable measurement component 18. In one embodiment, a prior art piston assembly 300 comprises a handle 20, a pump assembly section 22, and a connector 24 adapted to be fluidly connectively engageable with sample cup lid 4 connection component 6.

Figure 2A:
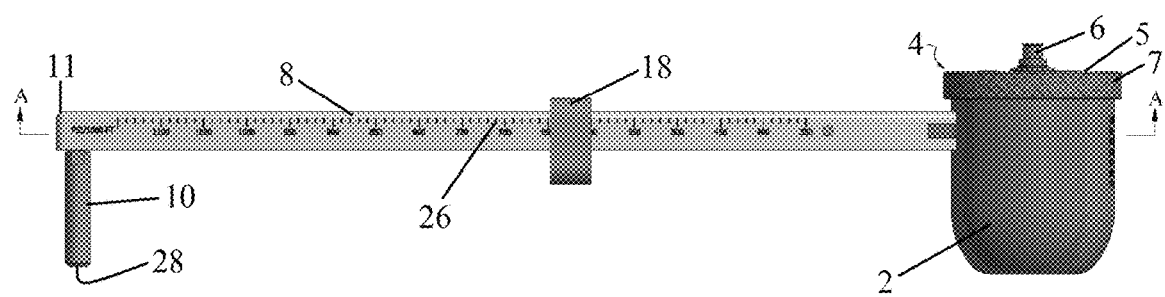
FIG. 2A is a depiction of a portion of a prior art pressurized mud balance.
Figure 2B:
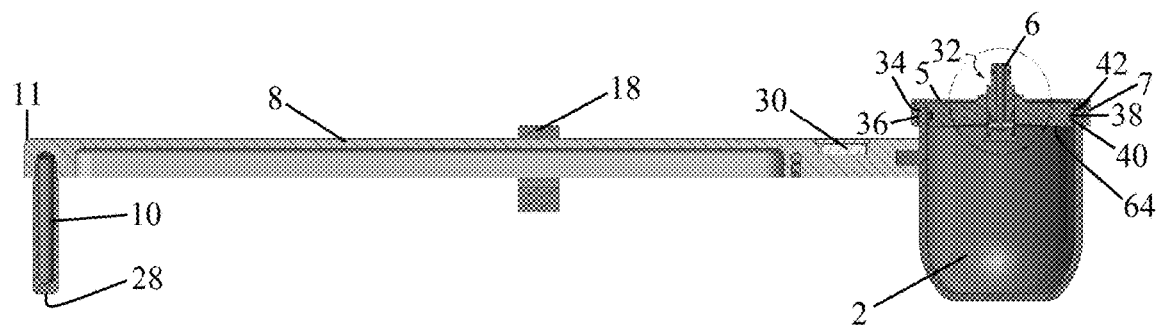
FIG. 2B is a depiction of a cross-section of the portion of the prior art pressurized mud balance depicted in FIG. 2A.

FIG. 2A depicts in greater detail a portion of an embodiment of a mud balance 200 as is generally known in the art. As shown in the embodiment of FIG. 2A, elongated lever 8 may comprise calibrated markings 26 along a portion of the length thereof. During operation of a mud balance 200, as will be described infra in more detail, after sufficient sample liquid (not shown) has been provided in sample cup 2 which is covered by sample cup lid 4, and then pressurized, slidable measurement component 18 is slid along elongated lever 8 until elongated lever 8 is disposed in a horizontal orientation. In one aspect, lever balance adjuster 10 is removably connected to, and thereby suspended beneath, elongated lever 8 proximate a distal end 11 thereof. In one aspect, connection of lever balance adjuster 10 to elongated lever 8 is via removable threaded connective engagement therewith. In one aspect, lever balance adjuster 10 is utilized for calibration of a mud balance 200, wherein incremental weight pellets (calibration beads) may be added to or removed from a cavity (not shown) within lever balance adjuster 10. In one aspect, a mud balance 200 calibration utilizing a sample of known density may be performed, wherein the positioning of slidable measurement component 18 with respect to calibrated markings 26 (for a sample of that density) along the elongated lever 8 in a level position is validated, or if inaccurate, calibration beads are added to or removed from lever balance adjuster 10 to properly balance elongated lever 8, as would be understood by one skilled in the art. In one embodiment, the dimensions of fulcrum component 14 and lever balance adjuster 10 are such that when elongated lever 8 is oriented parallel to a substantially flat surface (not shown) on which fulcrum support 16 rests, a bottom surface 28 of lever balance adjuster 10 is disposed above the substantially flat surface (not shown); i.e., bottom surface 28 of lever balance adjuster 10 is not in contact with the substantially flat surface (not shown). In one embodiment, an orientation indicator 30, such as a spirit level (also known as a bubble level), as shown in FIG. 2B, may be employed to ascertain when elongated lever 8 is horizontally oriented. In one embodiment, bubble lever 30 is integral to elongated lever 8.

As shown in FIG. 2B, which is a cross-sectional view, along axis A-A, of the mud balance depicted in FIG. 2A, sample cup lid assembly 4, which comprises a lid plate 5 and a knurled ring 7, may be attached to sample cup 2 by means of cooperative engagement of internal threading 34 of knurled ring 7 and external threading 36 of sample cup 2; wherein lid plate 5 is secured against thereby. In one embodiment, fluidly sealed attachment of sample cup lid assembly 4 to sample cup 2 may be further assured by utilization of an elastomeric seal 38, such as an O-ring, disposed within a circumferential groove 40 provided in an inner surface 42 of knurled ring 7. Further shown in FIG. 2B is connection component 6 of sample cup lid assembly 4. In one embodiment, connection component 6 is integral to lid plate 5, although in other embodiments (not shown), connection component 6 may be removably attachable to lid plate 5 or otherwise engageable therewith. In one embodiment, connection component 6 comprises a valve system 32.

Figure 3A:
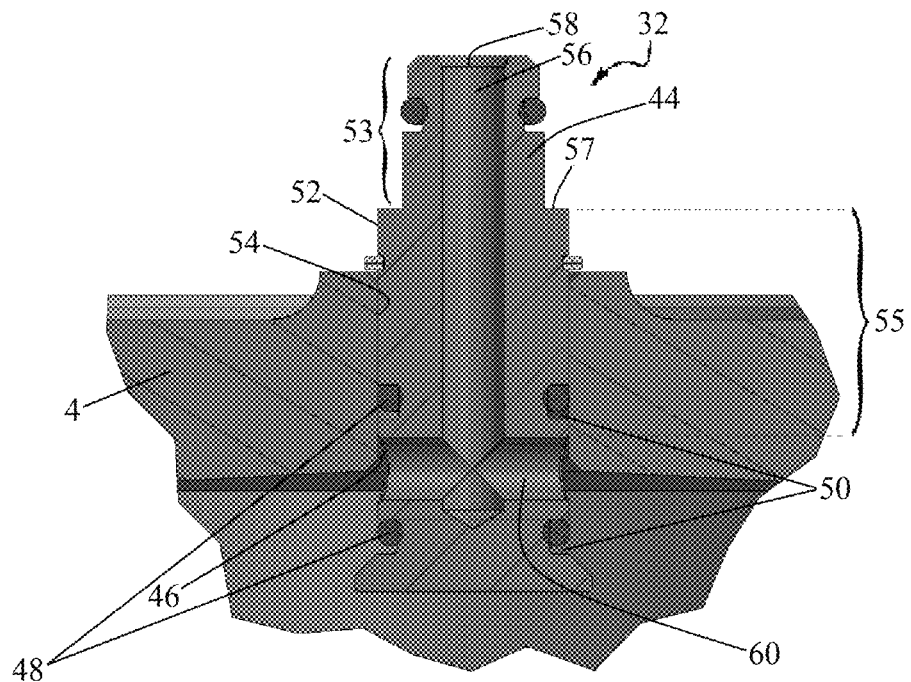
FIGS. 3A and 3B are depictions of a prior art check valve assembly of the pressurized mud balance portion depicted in FIG. 2B.
Figure 3B:
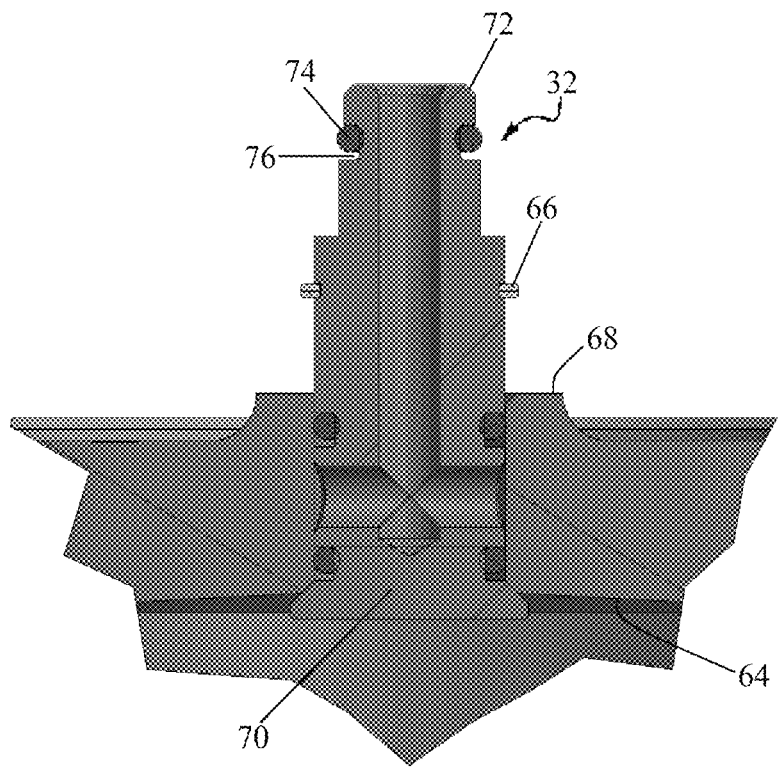

FIGS. 3A and 3B depict in greater detail the valve system 32 shown and encircled in FIG. 2B. In one aspect, valve system 32 allows for pressurization of a sample (not shown) disposed within sample cup 2. As depicted in FIGS. 3A and 3B, in one embodiment, valve system 32 comprises a slidable valve component 44 disposed at least partially within a valve channel 46. In one embodiment, valve component 44 is equipped with one or more elastomeric seals 48, such as O-rings, each disposed within a circumferential groove 50 provided in an outer surface 52 of valve component 44. In one aspect, each O-ring 48 provides a fluid seal between outer surface 52 and an inner surface 54 of valve channel 46, when positioned in contact with inner surface 54.

In the embodiment shown in FIGS. 3A and 3B, valve component 44 comprises an internal fluid channel 56. In one embodiment, valve fluid channel 56 is disposed such that it provides fluid communication between an open end 58 thereof and a sample flow cavity 60 of valve component 44. In the embodiment shown in FIGS. 3A and 3B, sample flow cavity 60 is oriented substantially perpendicular to fluid channel 56, although other orientations are employable. In one embodiment, sample flow cavity 60 extends substantially across the entirety of the inner diameter 62 of valve channel 46.

In one embodiment, valve component 44 may be slidingly displaced such that in an open (down) position, depicted in FIG. 3A, at least a portion of sample flow cavity 60 is disposed below a bottom interior surface 64 of sample cup lid 4, thereby fluidly connecting the interior of sample cup 2 with valve fluid channel 56. Valve component 44 may also be slidingly displaced such that in a closed (up) position, depicted in FIG. 3B, no portion of sample flow cavity 60 is disposed below the bottom interior surface 64 of sample cup lid 4, and fluid communication between the interior of sample cup 2 and valve fluid channel 56 is thereby prevented. In one embodiment, valve component 44 is pressure-actuated such that from an open (down) position, when the pressure force within sample cup 2 exceeds an external, downward force on valve component 44, the valve component 44 self-actuates to the closed (up) position, thereby fluidly sealing sample cup 2.

In one embodiment, valve component 44 comprises one or more stops 66 disposed about the outer surface 52 thereof. In one embodiment, a stop 66 comprises a protrusion extending at least partially circumferentially around the outer surface 52 of valve component 44. In one aspect, a stop 66 prevents further downward movement of valve component 44 within valve channel 46 beyond a position is which the stop 66 contacts an upper surface 68 of sample cup lid 4. In one embodiment, a bottom section 70 of valve component 44 is sized such that upward movement of valve component 44 within valve channel 46 is prevented beyond a position is which a portion of the bottom section 70 contacts bottom interior surface 64 of sample cup lid 4.

As further depicted in the embodiment shown in FIGS. 3A and 3B, valve component 44 comprises a sample cup lid connection component 6. In one aspect, connection component 6 is adapted and configured to allow for sealed fluid connection of a piston assembly thereto, as is discussed further infra. In one embodiment, connection component 6 comprises a beveled or curved top edge 72 for facilitation of attaching a piston assembly thereto. In one embodiment, connection component 6 is equipped with one or more piston connection elastomeric seals 74, such as O-rings, each disposed within a circumferential groove 76 provided in outer surface 52 of an upper portion 53 of valve component 44. In one embodiment, upper portion 53 of valve component 44 has a narrower diameter than a middle portion 55 of valve component 44, which provides an advancement stoppage surface 57 for an attached piston assembly.

Figure 4A:
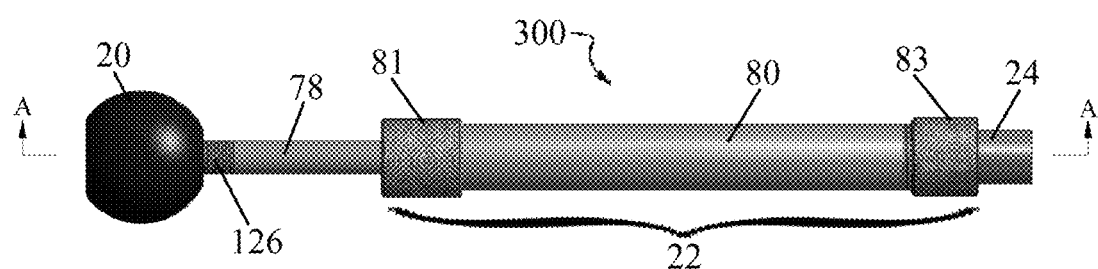
FIG. 4A is a depiction of a prior art piston assembly.
Figure 4B:
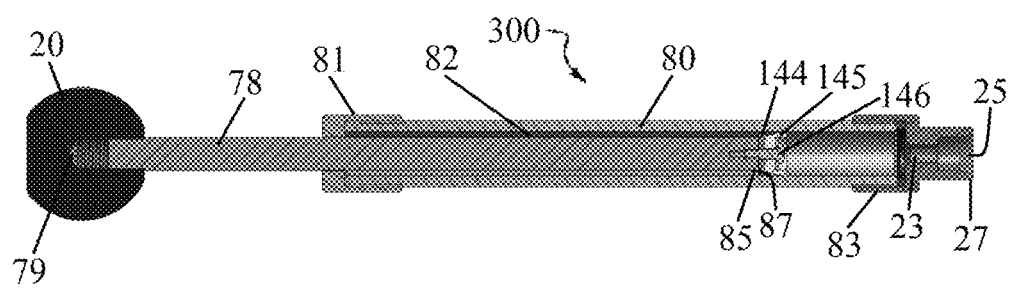
FIG. 4B is a depiction of a cross-section of the prior art piston assembly depicted in FIG. 4A.

Referring now to FIGS. 4A and 4B, a prior art piston assembly 300 is shown. As depicted in FIG. 4A, a prior art piston assembly 300 includes a handle 20, a pump assembly section 22, and a connector 24 adapted to be fluidly connectively engageable with sample cup lid 4 connection component 6. In one embodiment, pump assembly section 22 comprises a piston rod 78, a pump housing 80, an upper pump housing cap 81, and a lower pump housing cap 83. As shown in FIG. 4B, which is a cross-sectional view, along axis A-A, of the prior art piston of FIG. 4A, assembly section 22 comprises an internal pump bore 23 comprising an internal piston cavity 82 within which piston rod 78 is slidingly contained. An opening 25 in an end 27 of connector 24 allows for fluid communication with internal pump bore 23. Handle 20 is removably attached to a first end 79 of piston rod 78, such as by a screwed connection. In one aspect, attached to a second end 85 of piston rod 78 is a u-cup seal component 145. In one aspect, an annular flat metal washer 144 is disposed on the end surface 87 of piston rod 78, and a screw 146 extends through u-cup seal component 145 and washer 144, and longitudinally into piston rod 78, thereby attaching the u-cup seal component 145 to the piston rod 78. In one embodiment, connector 24 is adapted and configured to be removably fluidly sealingly attachable to valve system 32 via engagement with connection component 6.

In one aspect, prior art piston assembly 300 is adapted and configured to function like a syringe, wherein fluids (not shown) may be provided or withdrawn there through. In one embodiment, provision of a fluid (not shown) through a prior art piston assembly 300 allows for pressurization of a sample (not shown) contained within sample cup 2.

Figure 5A:
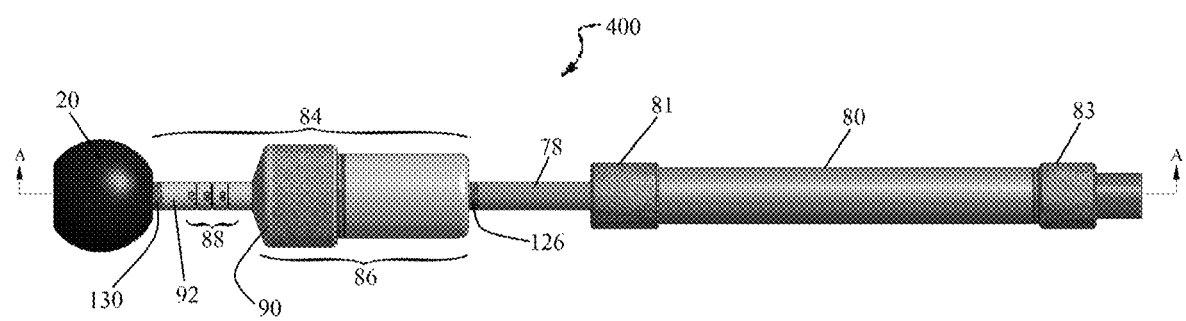
FIG. 5A is a depiction of an embodiment of a modified piston assembly of the present invention.
Figure 5B:
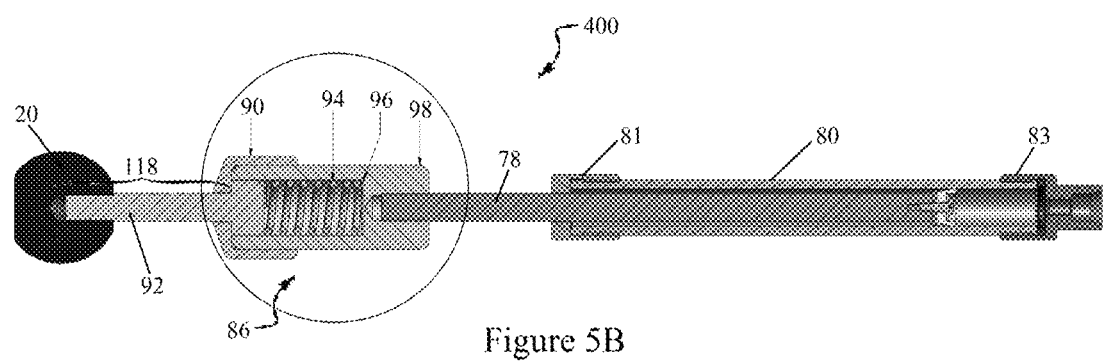
FIG. 5B is a cross-sectional view of the embodiment of a modified piston assembly of the present invention shown in FIG. 5A.

An embodiment of a modified piston assembly 400 of the present invention is depicted in FIGS. 5A and 5B. In one embodiment, modified piston assembly 400 is adapted and configured to be utilized in cooperation with a fluid density balance, such as, but not limited to, a mud balance 200. Like the prior art piston assembly 300, the modified piston assembly 400 may comprise a handle 20, a piston rod 78, a pump assembly section 22, and a connector 24 adapted to be fluidly connectively engageable with sample cup lid 4 connection component 6. In various embodiments, however, a modified piston assembly 400 further comprises a quantifying force management system 84. In the embodiment shown in FIGS. 5A and 5B, force management system 84 is longitudinally positioned intermediate a handle 20 and piston rod 78. In one embodiment, force management system 84 comprises a force application assembly 86, a force applicator 92, and a force indicator 88. In one embodiment, force application assembly 86 comprises a housing cap 90, a force translator 94, such a coil spring, a housing 98, and, optionally, one or more shims 96. In one embodiment, housing cap 90 may be removably attachable to housing 98 via, for example, screwed connection employing internal threading (not shown) disposed on the interior surface 91 of housing cap 90 and corresponding external threading 93 disposed on the exterior surface 101 of housing 98 (shown in FIG. 7A). In one embodiment, a force applicator 92, such as a piston-post, comprises a linearly calibrated scale (such as markings 132 shown in detail in FIGS. 7A and 7B), constituting a force indicator 88 for positionally quantifying applied force. In one embodiment (not shown), a force indicator 88 may comprise a single calibration indicator in lieu of a linear scale. In one embodiment, piston-post 92 is connected to handle 20 at one end thereof. In one embodiment, piston-post 92 is connected to force application assembly 86 at the other end thereof (see FIG. 5A).

Figure 6A:
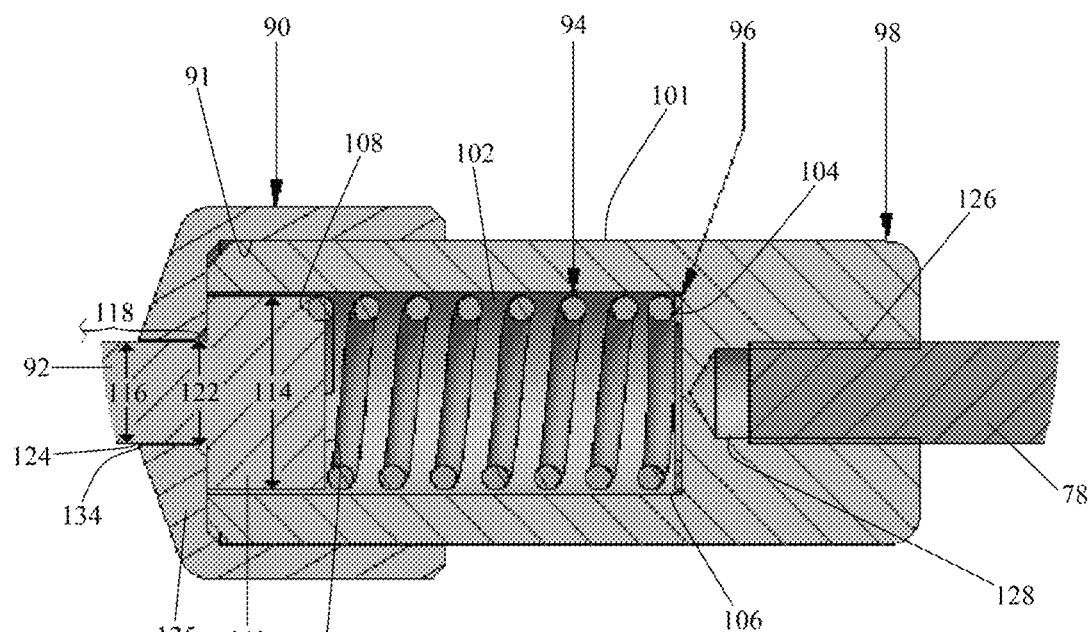
FIG. 6A is a detailed cross-sectional view of a portion of the modified piston assembly of the present invention shown in FIG. 5B.

FIG. 6A depicts in greater detail the force application assembly 86 shown and encircled in FIG. 5B. In the embodiment depicted in FIG. 6A, force application assembly 86 comprises a substantially cylindrical housing 98 comprising an internal bore 102. In one embodiment, force translator 94, and optionally, one or more shims 96, are positioned within internal bore 102 as shown in FIG. 6A. In one aspect, force translator 94 comprises a compressible component configured and adapted to transmit force longitudinally through the modified piston assembly 400. In one embodiment, force translator 94 comprises a mechanical device, such as a coil spring, also known as a helical spring, although other springs, such as wave springs (also known as flat wire compression springs), and other compressible devices or materials capable of performing the same function, including but not limited to, natural or synthetic rubber components, may be employed.

In one embodiment, one or more shims 96 are positioned intermediate a bottom surface 104 of coil spring 94 and an internal bore 102 bottom surface 106. In one aspect, a shim 96 is utilized to more precisely set the longitudinal position of the coil spring 94, as discussed infra. In one embodiment, coil spring 94 top surface 108 is disposed proximate piston-post 92 bottom surface 110.

In the embodiment shown in detail in FIG. 6A, piston-post 92 comprises a bottom portion 112 having a diameter 114 greater than a diameter 116 of a top portion 118 of piston-post 92, wherein diameter 114 is substantially equal to the diameter 120 of coil spring 92, and greater than the diameter 122 of an opening 124 which extends through a top portion 125 housing cap 90.

In one embodiment, force application assembly 86 is adapted and configured such that forced sliding longitudinal movement of piston-post 92 toward piston rod 78 biases bottom surface 110 of piston-post 92 against top surface 108 of coil spring 94, which, on the occurrence of sufficiently resisted longitudinal movement of piston rod 78 (discussed infra in more detail), results in longitudinal compression of coil spring 94 against shim 96 which abuts bottom surface 106 of housing 98, and therefore, longitudinal bias against piston rod 78 (which is interconnected with housing 98 as described infra).

Pursuant to Hooke's Law, as would be understood by one skilled it the art, when a coil spring is compressed or stretched from rest, the force involved is directly proportional to the change in its free length. A series of measurements, quantifying the linear displacement (deflection) of a coil spring 94 in response to varying known force applications, can be charted. Results of some such measurements of various springs are listed below in Table 1.

TABLE 1

| Spring | Spring Free Length (Inches) | Force Applied (Pounds.) | Compressed Spring Length (Inches) | Deflection Differential Between Loads (Inches) | Spring Force Constant (Pounds/Inch) |
|---|---|---|---|---|---|
| 1 | 1.25 | 30 | 0.8139 | 0.1453 | 68.8 |
|   |      | 40 | 0.6686 |        |      |
| 2 | 1.00 | 30 | 0.6636 | 0.0555 | 89.2 |
|   |      | 40 | 0.5515 |        |      |
| 3 | 1.25 | 30 | 0.9090 | 0.1136 | 88.0 |
|   |      | 40 | 0.7954 |        |      |
|   |      | 50 | 0.6818 |        |      |
| 4 | 1.25 | 30 | 0.9375 | 0.1041 | 96.0 |
|   |      | 40 | 0.8330 |        |      |
|   |      | 50 | 0.7292 |        |      |
|   |      | 60 | 0.6250 |        |      |
| 5 | 1.25 | 30 | 1.0017 | 0.1170 | 128.7 |
|   |      | 40 | 0.9392 |        |      |
|   |      | 50 | 0.8615 |        |      |
|   |      | 60 | 0.7838 |        |      |
| 6 | 1.25 | 30 | 0.9071 | 0.117  | 87.5 |
|   |      | 40 | 0.7928 |        |      |
|   |      | 50 | 0.6785 |        |      |
| 7 | 1.50 | 30 | 1.2120 | 0.096  | 104.3 |
|   |      | 40 | 1.1160 |        |      |
|   |      | 50 | 1.0206 |        |      |
|   |      | 60 | 0.9247 |        |      |
|   |      | 70 | 0.8288 |        |      |
| 8 | 1.25 | 30 | 0.7661 | 0.1612 | 62.0 |
|   |      | 40 | 0.6048 |        |      |

The resulting directly proportional relationship between the distance of linear compression of a coil spring 94 and the magnitude of applied force is employed to provide a linear scale correlating a particular observed spring compression distance to an applied force, thereby providing for quantification of the force applied to achieve that particular spring compression distance. In other embodiments (not shown), such as where a single force quantity indication is required, a force translator 94 may comprise a compressible component that does not exhibit a linear response to compressive forces. In such embodiments (not shown), a single designator of displacement may be employed.

Figure 7A:
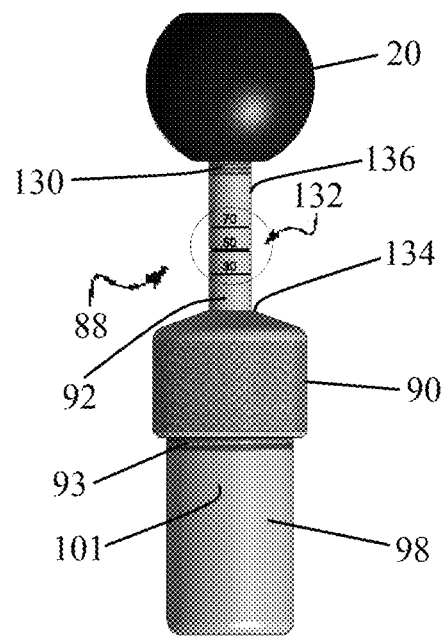
FIGS. 7A and 7B are detailed views of an embodiment of a piston-post of a modified piston assembly of the present invention.
Figure 7B:
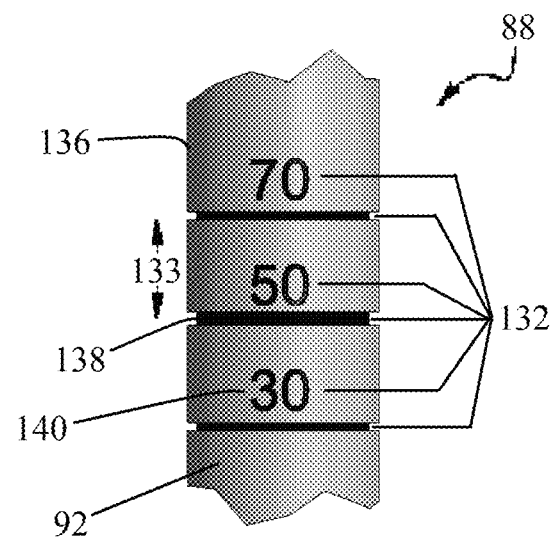

Referring now to FIGS. 7A and 7B, in one embodiment, force indicator 88 comprises one or more markings 132 that are employable to indicate linear displacement of piston-post 92 in relation to, inter alia, housing cap 90 of force application assembly 86. In one embodiment, force indicator 88 comprises a calibrated series of such markings 132. In one embodiment, one or more markings 132 are etched in an exterior surface 136 of piston-post 92. Since coil spring 94 compression results from movement of piston-post 92, any longitudinal compression of coil spring 94 is accompanied by concomitant longitudinal movement of markings 132 of force indicator 88 toward a top surface 134 of housing cap 90. Thus, observation of the longitudinal position of piston-post 92 in relation to housing cap 90 of force application assembly 86 provides an indication of the force being applied to and transferred by coil spring 94. Accordingly, during operation of force management system 84, the linear displacement of markings 132 corresponds to an amount of force applied by force application assembly 86 against piston rod 78.

The positioning of markings 132 along piston-post 92 is determined from the experimental spring coil pressure results, as the markings 132 can be provided along the piston-post 92 at a distance separated from top surface 134 of housing cap 90 wherein the separation distance corresponds to the spring coil 94 deflection based on the quantified spring coil 94 deflection characteristics. For example, with regard to Spring 1 identified in Table 1, the 30 pound force deflection distance of that spring, from its free (at rest) length (1.25 inches) to its compressed length under 30 pounds of force (0.8139 inches), is 0.4361 inches (1.25 inches minus 0.8139 inches), so that a marking 132 desired to be indicative of 30 pounds of force during operation of force management system 84 is provided on piston-post 92 such that it is disposed 0.4361 inches away from top surface 134 of housing cap 90 when spring coil 94 is at rest.

The relative positioning of markings 132 is also derived from the experimentally obtained correlation between coil spring 94 compression and applied force. Again referring to the exemplary Spring 1 in Table 1, the deflection differential between the 30 pound force compressed spring length (0.8139 inches), and the 40 pound force compressed spring length (0.6686 inches), yields a 10 pound force differential of 0.1453 inches (0.8139 inches minus 0.6686 inches). Accordingly, markings 132 desired to indicate force amounts that differ by 10 pounds force are spaced along piston-post 92 at 0.1453 inch intervals 133.

In the embodiment shown in FIGS. 7A and 7B, markings 132, which may include one or more marking lines 138 and/or one or more marking numerals 140, indicate the experimentally determined, linearly proportional, quantity of force, required to displace piston-post 92 and compress coil spring 94, whereby a particular marking 132, such as a marking line 138, which may be disposed below and associated with a particular marking numeral 140 (indicating, for example, a quantify of force in pounds of force), aligns with top surface 134 of housing cap 90. For example, with regard to the embodiment of force indicator 88 depicted in FIGS. 7A and 7B, if piston-post 92 is longitudinally advanced such that coil spring 94 is longitudinally compressed sufficiently whereby the marking line 138 immediately below marking numeral 140 indicating "50" is disposed aligned with top surface 134 of housing cap 90, then it can be ascertained that the force being applied to coil spring 94 is equal to fifty pounds of force. In one embodiment (not shown), force management system 84 is equipped with a mechanism for maintaining, i.e., "locking," piston-post 92 at a desired force application position.

In practice, the correct positioning of markings 132 of force indicator 88 may be verified, as would be understood by one skilled in the art. In one embodiment, the accurate location of a particular marking line 138 on piston-post 92 is verified using a calibration device (calibrator) (not shown), the design and operation of which is similar to a mechanical "C" clamp, bench vise, or machine vise, an example of which is a Test Cell Safety Clamp, available from OFI Testing Equipment, Inc., of Houston, Tex. As would be understood by one skilled in the art, the space between the "jaws" of the calibrator frame is configured to accommodate the force management system 84, with or without a handle 20 attached thereto, and an electronic force measurement device (not shown), such as a load cell, to perform the verification testing. The electronic load cell used in the calibrator may be certified and traceable to industry acceptable standards. In one embodiment, a screw on the calibrator frame is turned in a first direction to slowly squeeze (compress) the combined force management system 84 and electronic load cell, and turned in the opposite direction to release (decompress) the combined force indicator and electronic load cell.

To verify the accuracy of a particular marking line 138, the calibrator is operated to compress the combined force management system 84 and electronic load cell until the electronic load cell indicates a force amount equal to that desired to be indicated by that marking line 138. At that force, the marking line 138 should align with top surface 134 of housing cap 90 of the force application assembly 86 of the force management system 84 being tested. This testing operation may be repeated one or more times. If the marking line 138 does not correctly align with top surface 134, the force management system 84 force application assembly 86 can be disassembled and shim 96 adjustments made, as described in greater detail infra, whereby, upon reassembly of force application assembly 86, force management system 84 is configured to allow the marking line 138 to accurately align with top surface 134. In addition, if the coil spring 94 is damaged or otherwise exhibits changed force compression characteristics, replacement thereof in addition to, or in lieu of, shim adjustments, may be required, as would be understood by one skilled in the art.

In one aspect, verification testing of a particular marking line 138 may result in an observation that at a tested force quantity, the marking line is disposed above (outside) top surface 134 of housing cap 90. In one embodiment, correction of such an error in positioning comprises measuring, at the tested force level, the distance between that marking line 138 and the top surface 134 of housing cap 90, using, for example, a Vernier caliper. In one embodiment, a correction is made by disassembling the force application assembly 86, and decreasing the total thickness of any shim(s) 96 already present whereby the decreased total shim thickness equals the original total shim thickness minus the measured distance. The force application assembly is then reassembled and the verification testing of that marking 138 repeated. This error correction process may be repeated if necessary.

In one aspect, verification testing of a particular marking line 138 may result in an observation that at a tested force quantity, the marking line is disposed below (inside) top surface 134 of housing cap 90. In this situation, correction of such an error in positioning comprises measuring the distance between the next higher force marking line 138 disposed on piston-post 92, and the top surface 134 of housing cap 90, using, for example, a Vernier caliper. The measured distance is then subtracted from the marking line 38 separation distance for that spring, to yield a shim thickness deficiency. For example, with reference again to Spring 1 in Table 1, if during verification testing of marking line 138 desired to be indicative of 30 pounds of force, that marking line 138 is disposed below (inside) top surface 134 of housing cap 90, the distance between the next higher force marking line 138 (40 pounds), and the top surface 134 of housing cap 90 is measured, using, for example, a Vernier caliper. The measured distance is then subtracted from the experimentally determined 10-pound marking 132 distance interval 133 (0.1453 inches) to determine the shim thickness deficiency in inches. In one embodiment, a correction is made by disassembling the force application assembly 86, increasing the total thickness of any shim(s) 96 already present (or incorporating one or more shims 96 if none present) whereby the increased total shim thickness equals the original total shim thickness (if any) plus the determined shim thickness deficiency. The force application assembly is then reassembled and the verification testing of tested marking 138 repeated. This error correction process may be repeated if necessary.

Figure 8:
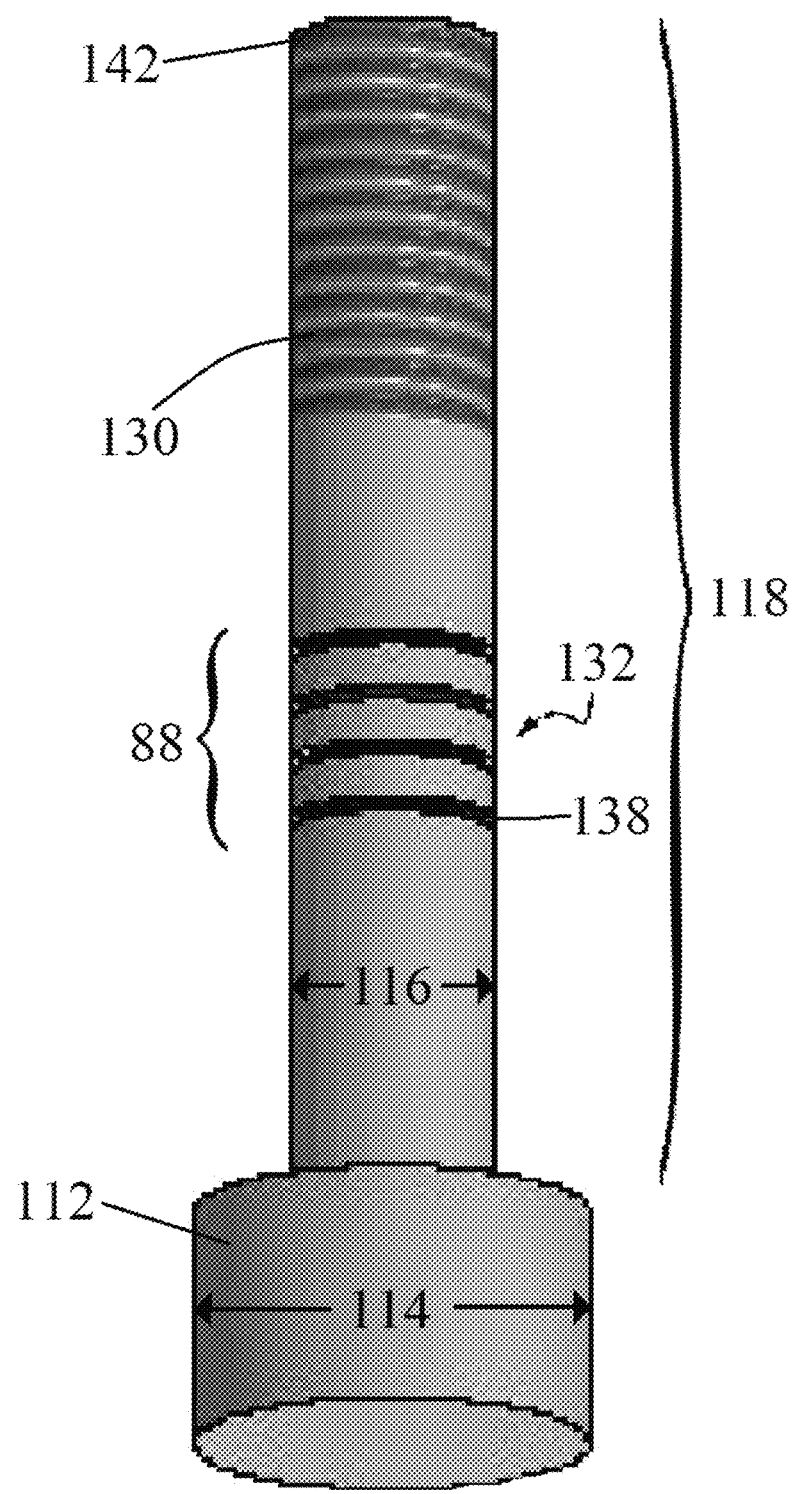
FIG. 8 is another detailed view of an embodiment of a piston-post of the present invention.

FIG. 8 depicts a detailed view of an embodiment of a piston-post 92 of the present invention. In this embodiment, piston-post 92 comprises a top portion 118 and a bottom portion 112. In this embodiment, markings 132 comprise marking lines 138. In one embodiment, marking lines 138 are etched into exterior surface 136 of piston-post 92 as previously described. In one embodiment, top portion 118 of piston-post 92 and/or bottom portion 112 of piston-post 92 comprises a substantially round geometry, although other shapes may be employed. In one embodiment, the diameter 114 of bottom portion 112 of piston-post 92 and/or the diameter 116 of top portion 118 of piston-post 92 may be consistent along that component, however the invention is not so limited and one or both diameters 114 and 116 may vary there along. In one embodiment, piston-post 92 is adapted and configured to allow attachment of a handle 20 to a top end 142 of piston-post 92, such as by utilizing an exterior threading 130 of piston-post 92 in engagement with a corresponding interior threading (not shown) of a handle 20. In other embodiments (not shown) a handle 20 may be attachable, removably of irremovably, to piston-post 92 by other known means, as would be understood by one skilled in the art. In other embodiments (not shown), a handle 20 may be provided integral with piston-post 92.

Figure 6B:
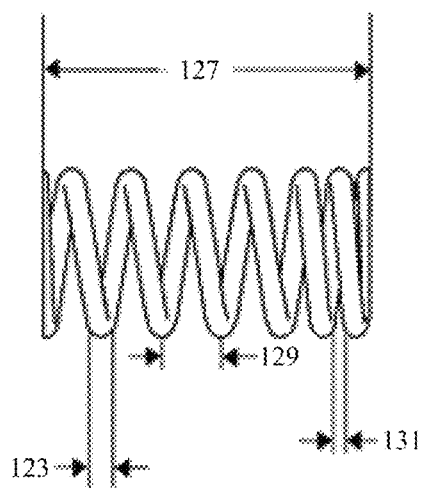
FIGS. 6B and 6C depict views of an embodiment of a coil spring of the present invention.
Figure 6C:
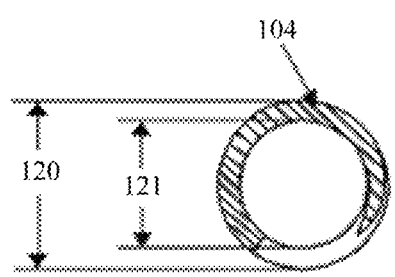

Referring now to FIGS. 6B and 6C, in various embodiments, coil spring 94 may comprise different materials of construction, internal diameter 121, external diameter 120, free (non-compressed, non-stretched) length 127, wire thickness 123, pitch 129, coil spacing 131, compressive force characteristics, helix direction, and ends finish. In one embodiment, coil spring 94 comprises stainless steel. In one embodiment, a coil spring 94 has an external diameter 120 of between about 0.60 inches and about 0.72 inches. In one embodiment, a coil spring 94 has wire thickness 123 of between about 0.08 inches and about 0.95 inches. In one embodiment, a coil spring 94 has a free length 127 of between about 1.0 to 1.5 inches. In one embodiment, a coil spring 94 has a compression rate of between about 68 pounds per inch and about 129 pounds per inch.

In various embodiments, force indicator 88 may comprise various forms of markings 132. In one embodiment, marking lines 138 are employed, although other designators of location along piston-post 92 may be utilized. In one embodiment, marking lines 138 are circumferentially etched in outer surface 136 of piston-post 92. In other embodiments (not shown) marking lines 138 may be provided by printing, painting, or some other form of addition of visible material to the outer surface 136 of piston-post 92. In one embodiment, marking numerals 140, which each correspond to a particular designation of location along piston-post 92, are employed, although other quantifying designators may be utilized. In one embodiment, marking numerals 140 are etched in outer surface 136 of piston-post 92. In other embodiments (not shown) marking numerals 140 may be provided by printing, painting, or some other form of addition of visible material to the outer surface 136 of piston-post 92.

In various embodiments, a prior art piston assembly 300 may be modified via addition of a force management system 84 to provide a modified piston assembly 400. In one such embodiment, the prior art piston 300 shown FIGS. 4A and 4B may be employed. As depicted in FIGS. 4A and 4B, the prior art piston assembly 300 comprises a handle 20 removably attached to a piston rod 78, such as by engagement of exterior threading 126 of piston rod 78 to corresponding interior threading (not shown) of handle 20. In one embodiment, upon disengagement of the handle 20 from the piston rod 78, a force management system 84 may be connected to the piston rod 78 via engagement of exterior threading 126 of piston rod 78 with corresponding interior threading (not shown) of a connection bore 128 of housing 98 of force application assembly 86, and connected to the handle 20 via engagement of exterior threading 130 of piston-post 92 to the interior threading (not shown) of handle 20. In one embodiment, force management system 84 includes a new handle 20 attachable to or integral with piston-post 92 in lieu of the handle 20 disengaged from piston rod 78.

Figure 9:
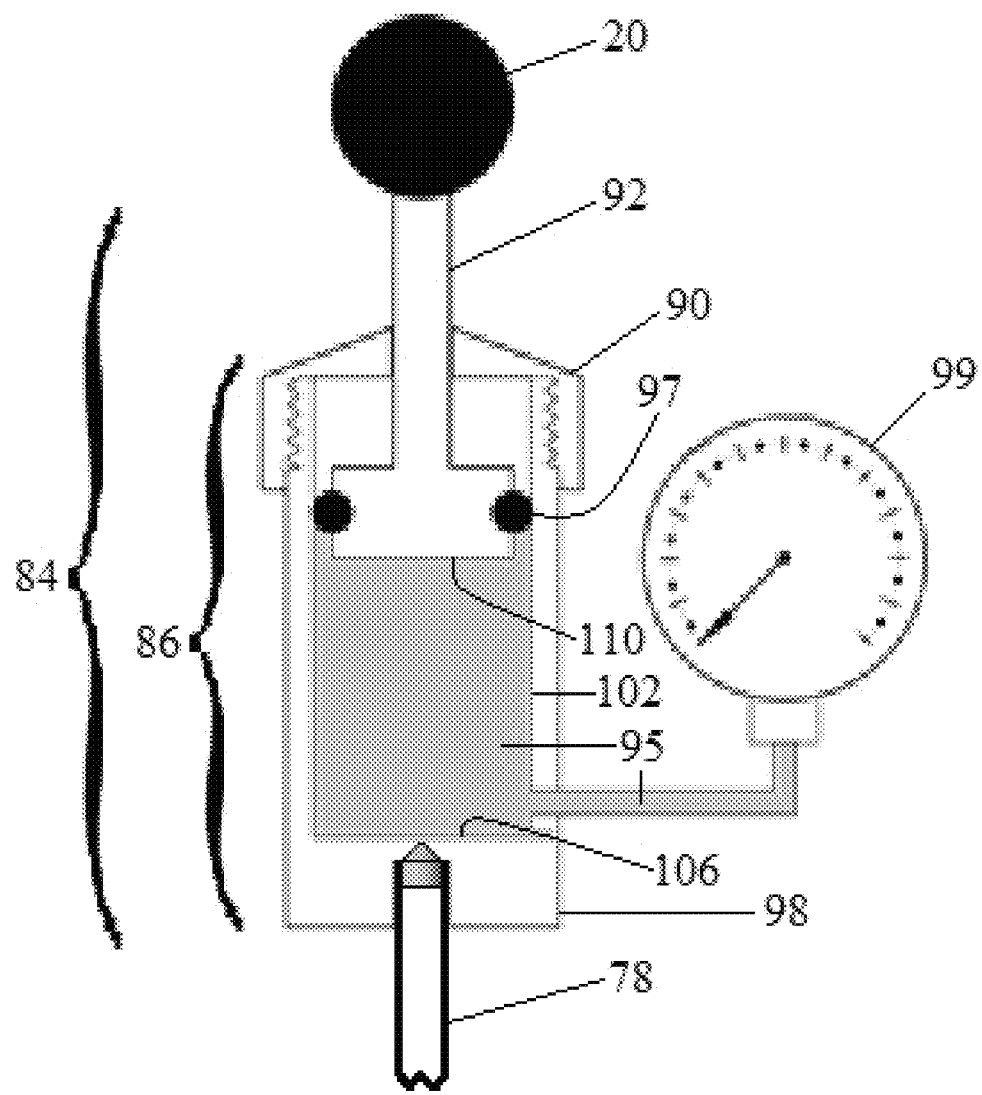
FIG. 9 is a view of an embodiment of a force management system of the present invention.

In another aspect of the invention, a modified piston assembly 400 comprises a force management system 84 having a force application assembly 86 which utilizes a force translator 94 comprising a substantially incompressible liquid. In one embodiment shown in FIG. 9, a force application assembly 86 comprises, in lieu of a coil spring, a force translator 94 comprising a substantially incompressible liquid 95 contained within internal bore 102 of housing 98. In one embodiment, useful liquids include, but are not limited to, mineral oil, silicone oil, and water. In one embodiment, one or more O-rings 97 may be employed within housing 98 to assist in sealing liquid 95 there within.

In various embodiments, similarly to as described above, longitudinal force applied via handle 20 effectuates movement of piston-post 92 which biases bottom surface 110 of piston-post 92 against liquid 95, which is in fluid communication with bottom surface 106 of housing 98, thereby resulting in longitudinal bias against piston rod 78 (only partially shown in FIG. 9) via its interconnection with housing 98. In one embodiment, liquid 95 is in fluid communication with a pressure measurement device 99, such as a pressure gauge or calibrated pressure transducer, which may utilize analog (shown) and/or digital (not shown) technology. In one embodiment, pressure measurement device 99 is utilized to quantify the force being applied to piston-post 92. In one embodiment, a pressure measurement device 99 comprises, or is informationally in communication with, directly or indirectly, in a wired or wireless manner, a computer processor.

In one embodiment (not shown), a force application assembly 86 comprises, in lieu of a coil spring, a force translator 94 comprising a load cell, such as, but not limited to, a hydraulic, pneumatic, or strain gauge load cell. In such an embodiment, force applied via said piston-post 92 is quantified by said load cell, which displays and/or transmits, in a wired or wireless manner, said force quantity information.

In other embodiments (not shown), a modified piston assembly 400 may comprise a force management system 84 comprising a force application assembly 86 which utilizes a sacrificial component, such as, but not limited to, a rupture disc, shear pin, or other means of ensuring that a desired bias against piston rod 78, via a force applicator 92, is applied, as would be understood by one skilled in the art. In various embodiments of a force management system 84 which utilize a pressure measurement device and/or another means of ensuring application of a desired bias against piston rod 78, a force indicator 88 may be employed in addition thereto.

Operation

In various embodiments, a modified piston assembly 400 of the present invention may be employed in the measurement of the density of a liquid sample, such as, but not limited to, a cement slurry. In one embodiment, measurement of a cement slurry sample is performed in accordance with the method outlined in API RP10B-2, Section 6. A mud balance, such as mud balance 200, is provided. In one embodiment, a portion of a cement slurry sample (not shown) is introduced into a sample cup 2 such that the cup 2 is substantially filled by the liquid sample. The sample cup lid assembly 4 is then provided onto the top of the sample cup 2, as depicted in FIGS. 1, 2A, and 2B, wherein, in one embodiment, an integrated lid plate 5 and connection component 6 is secured thereto with knurled ring 7, as described supra, wherein the slidable valve component 44 of the valve system 32 of sample cup lid 4 connection component 6 is provided in the open (down) position, as depicted in FIG. 3A.

In one embodiment, a modified piston assembly 400 is then provided. In one aspect, an additional amount of cement slurry is introduced to the modified piston assembly 400, as is known in the art, by, with piston rod 78 inserted substantially as far as possible into piston cavity 82, immersing connector 24 into a vessel (not shown) containing the remainder of the cement slurry sample (not shown), and while maintaining the connector 24 immersed in the sample slurry, grasping the handle 20 and pulling it away from the connector 24, thereby slidingly withdrawing piston rod 78 partially from piston cavity 82, whereby a quantity of the cement slurry sample (not shown) is aspirated into the piston cavity 82, while being careful to keep from introducing any gas into piston cavity 82.

In one embodiment, the modified piston assembly 400 containing the quantity of cement slurry sample (not shown) there within is fluidly connected to sample cup lid 4 via engagement of connector 24 with connection component 6 of sample cup lid 4, said slidable valve component 44 still being maintained in the open (down) position. Force is then applied to the handle 20, whereby force is transmitted by force management system 84 to piston rod 78, to slidingly advance piston rod 78 in piston cavity 82 toward connector 24, thereby introducing a least a portion of the cement slurry sample (not shown) contained in the modified piston assembly 400 into the sample cup 2, until the sample cup 2 becomes substantially completely filled with the cement slurry sample (not shown). In one aspect, an indication that the sample cup 2 is substantially completely filled with cement slurry sample (not shown) is that significant additional resistance to advancement of piston rod 78 in piston cavity 82 toward connector 24 is experienced.

In one embodiment, as previously described, piston rod 78 may then be at least partially slidingly drawn away from connector 24 to aspirate a portion of the cement slurry sample (not shown) contained in sample cup 2 into the modified piston assembly 400, and the sample cup 2 refilled as described supra. This process of withdrawing a portion of the cement slurry sample (not shown) contained in sample cup 2 and then reintroducing cement slurry sample (not shown) into sample cup 2 may be performed one or more times, as would be understood by one skilled in the art, to minimize the possibility that gas bubbles/pockets are present in the cement slurry sample (not shown) within sample cup 2.

In one embodiment, at a juncture when the sample cup 2 is substantially completely filled with cement slurry sample (not shown) and modified piston assembly 400 is still fluidly connected to sample cup 2 via engagement of connector 24 with sample cup lid 4 connection component 6, additional force is then applied to handle 20, whereby coil spring 94 is compressed by piston-post 92, and whereby the cement slurry sample (not shown) contained in sample cup 2 is pressurized by force transferred through pump assembly section 22. During this pressurization process, a small quantity of the cement slurry sample (not shown) still contained in modified piston assembly 400 may be introduced to sample cup 2, as would be understood by one skilled in the art.

As coil spring 94 is being compressed, markings 132 of piston-post 92 advance toward housing cap 90. In one embodiment, when a desired marking line 138 aligns with top surface 134 of housing cap 90, and thus a desired force is being applied to the cement slurry sample (not shown) contained in sample cup 2, this configuration is maintained while the entire modified piston assembly 400 is disengaged from connection component 6 of sample cup lid 4, whereby valve component 44 of valve system 32 is allowed to move upward (self-actuate) from its open (down) position to a closed (up) position, thereby fluidly sealing sample cup 2, as depicted in FIG. 3B.

In an embodiment employing a force application assembly 86 that utilizes a liquid 95 as the force translator 94, force is applied to handle 20 as described above, and as liquid 95 is being compressed, a force being translated to piston rod 78 is measured and quantified by pressure measurement device 99. In various embodiments (not shown) utilizing a force application assembly 86 that comprises a load cell a force being translated to piston rod 78 is measured and quantified by said load cell. In various embodiments (not shown) utilizing a force application assembly 86 that comprises a sacrificial component, a desired force being translated to piston rod 78 is determined by observation or other indication of sacrifice of said component. As further described above, when a desired such force is achieved, piston assembly 400 may be disengaged from connection component 6 of sample cup lid 4.

Upon disengagement of modified piston assembly 400 from connection component 6 of sample cup lid 4, sample density is measured using mud balance 200 as is known in the art. Prior to density measurement, the exterior of sample cup 2 may be cleaned to remove any cement slurry sample (not shown) therefrom. While the above-disclosed operational description specifically details density measurement of a cement slurry, the procedure is applicable to any liquid sample.

Method

Figure 10:
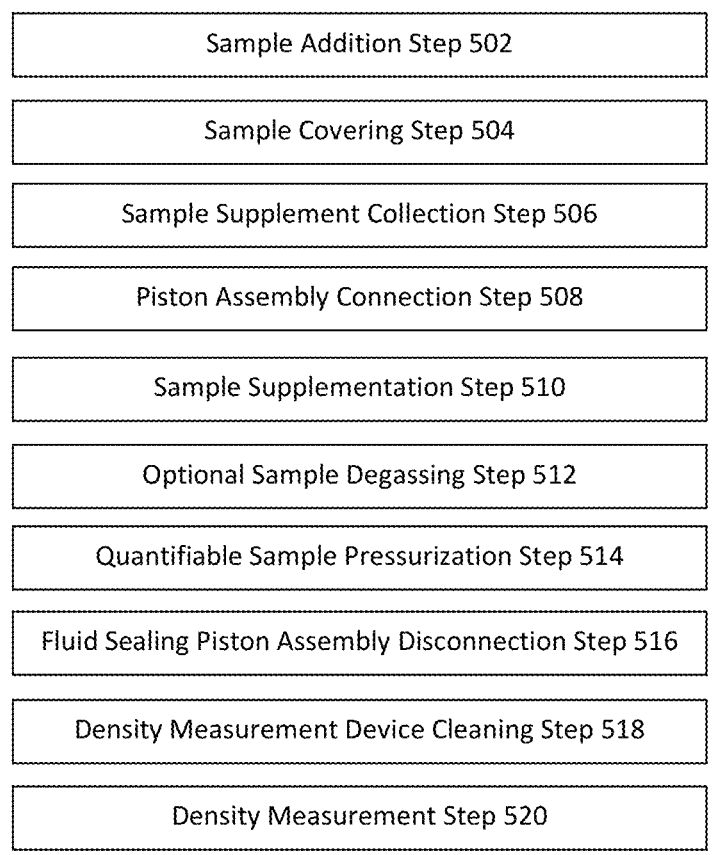
FIG. 10 lists exemplary steps of an embodiment of a density measurement method of the present invention.

In one embodiment, a density measurement method 500 of the present invention, as shown in FIG. 10, comprises the following steps.

A Sample Addition Step 502, comprising adding a quantity of a liquid sample to a sample cup, such as sample cup 2, of a density measurement device, such as mud balance 200.

A Sample Covering Step 504, comprising securing a sample cover, such as sample cup lid 4, to sample cup 2, wherein sample cup lid 4 is equipped with a sample sealing system, such as valve system 32, of a sample cup lid 4 connection component, such as connection component 6.

A Sample Supplement Collection Step 506, comprising utilizing a piston assembly, such as modified piston assembly 400, to collect an additional quantity of the liquid sample therein.

A Piston Assembly Connection Step 508, comprising fluidly connecting the modified piston assembly 400 to the sample cup lid 4 valve system 32, via engagement of a modified piston assembly 400 connector, such as connector 24, with the valve system 32 connection component 6, wherein a valve system 32 slidable valve component, such as valve component 44, is disposed in an open configuration.

A Sample Supplementation Step 510, comprising transferring a quantity of the sample liquid from the modified piston assembly 400 to the sample cup 2, whereby sample cup 2 is thereby substantially filled with liquid sample.

Optional Sample Degassing Step 512, comprising utilizing the modified piston assembly 400 to withdraw a portion of the sample liquid contained within sample cup 2, and then transferring at least a portion of the sample liquid contained within the modified piston assembly 400 back into the sample cup 2, whereby sample cup 2 is substantially refilled with liquid sample.

A Quantifiable Sample Pressurization Step 514, comprising utilizing the modified piston assembly 400 to quantifiably pressurize the liquid sample contained in the sample cup 2, wherein force is exerted on a force applicator, such as piston-post 92, which is transferred to the liquid sample via a force translator, such as coil spring 94, wherein utilizing a force indicator, such as force indicator 88, the pressure force experienced by the liquid sample in the sample cup 2 is quantified.

A Fluid Sealing Piston Assembly Disconnection Step 516, comprising, while maintaining the liquid sample in sample cup 2 at the quantified pressure level, disconnecting the modified piston assembly 400 from the valve system 32 connection component 6, whereby valve component 44 is actuated into a closed configuration, thereby fluidly sealing the liquid sample in sample cup 2.

A Density Measurement Device Cleaning Step 518, comprising removing any liquid sample present on the exterior of the mud balance 200.

A Density Measurement Step 520, comprising utilizing the mud balance 200 to measure the density of the liquid sample.

As would be understood by one skilled in the art, method 500 is only exemplary, and may be modified to accomplish specific results, such modifications including, but not limited to, combining, adding, deleting, re-ordering, and/or repeating one or more steps. For example, when utilizing a force translator 94 comprising a liquid 95, the force indicator may comprise a pressure measurement device 99 in lieu of, or in addition to, a force indicator 88. As would also be understood by one skilled in the art, while method 500 has been described as a plurality of steps, in various embodiments, two or more steps may be performed concurrently.

While the present invention has been disclosed and discussed in connection with the foregoing embodiments, it will be understood that the invention is not limited to the embodiments disclosed, but is capable of numerous rearrangements, modifications, and substitutions of parts and elements without departing from the spirit and scope of the invention.

We claim:

1. A force management system comprising:
a force applicator;
a force application assembly, comprising:
   a housing comprising an internal bore;
   a housing cap; and
   a force translator; and
a force indicator;
wherein:
   said force translator is positioned within said internal bore of said housing;
   said housing cap is removably attachable to said housing;
   said force translator is compressible within said internal bore of said housing in response to an application of force via said force applicator;
   said force applicator extends through an opening in said housing cap and is employable to apply force to, and thereby compress, said force translator;
   said force translator is configured such that a distance said force translator is compressed in response to the application of force via said force applicator is proportional to a quantity of force applied;
   upon the application of force via said force applicator, said force indicator indicates the quantity of force being applied by said force applicator; and
   said force management system is connectable to a piston rod component of a piston assembly employable with a fluid density balance.

2. The force management system of claim 1, wherein said force translator comprises a coil spring.

3. The force management system of claim 2, wherein said force application assembly comprises a shim positioned between a bottom surface of said coil spring and a bottom surface of said internal bore of said housing.

4. The force management system of claim 1, wherein said force indicator comprises one or more markings disposed on an exterior surface of said force applicator, and wherein a position of said markings on said force indicator in relation to a position of said force application assembly indicates the quantity of force being applied by said force applicator.

5. The force management system of claim 1, wherein said force translator comprises a substantially incompressible liquid.

6. The force management system of claim 5, comprising a pressure measurement device that indicates the quantity of force being applied by said force applicator.

7. The force management system of claim 1, wherein said force translator comprises a load cell.

8. The force management system of claim 1, comprising a force-actuated sacrificial component.

9. A piston assembly comprising:
a pump assembly; and
a force management system;
wherein:
   said pump assembly comprises:
      a piston rod,
      a pump housing
      a piston cavity;
      an upper pump housing cap;
      a lower pump housing cap; and
      a connector; and
   said force management system comprises:
      a force applicator;
      a force application assembly, comprising:
         a housing comprising an internal bore;
         a housing cap; and
         a force translator; and
      a force indicator;
   wherein:
      said pump assembly is connected at a first end thereof to a second end of said force application assembly via said piston rod;
      said force applicator is longitudinally engaged with a first end of said force application assembly;
      said pump assembly, via sliding movement of said piston rod within said piston cavity, takes in or expels fluids through an orifice in a second end of said pump assembly, said orifice being fluidly connected to said piston cavity;
      said connector is fluidly connectively engageable with a connection component of a fluid density balance, wherein engagement of said connector with said connection component of said fluid density balance provides fluid communication between said orifice and said connection component of said fluid density balance;
      said force translator is positioned within said internal bore of said housing;
      said housing cap is removably attachable to said housing;
      said force applicator extends through an opening in said housing cap and is employable to apply force to, and thereby compress, said force translator;
      said force translator is compressible within said internal bore of said housing in response to an application of force via said force applicator;
      said force translator is configured such that a distance said force translator is compressed in response to the application of force via said force applicator is proportional to a quantity of force applied;
      upon the application of force to said force translator via said force applicator, said force indicator indicates the quantity of force being applied via said force applicator; and
      upon the application of force to said force translator via said force applicator, said force is longitudinally transmitted to said piston rod.

10. The piston assembly of claim 9, wherein said force translator comprises a coil spring.

11. The piston assembly of claim 10, wherein said force application assembly comprises a shim positioned between a bottom surface of said coil spring and a bottom surface of said internal bore of said housing.

12. The piston assembly of claim 9, wherein said force indicator comprises one or more markings disposed on an exterior surface of said force applicator, and wherein a position of said markings on said force indicator in relation to a position of said force application assembly indicates the quantity of force being applied by said force applicator.

13. The piston assembly of claim 9, wherein said force translator comprises a substantially incompressible liquid.

14. The piston assembly of claim 13, comprising a pressure measurement device that indicates the quantity of force being applied by said force applicator.

15. The piston assembly of claim 9, wherein said force translator comprises a load cell.

16. The piston assembly of claim 9, comprising a force-actuated sacrificial component.

17. A method for quantifying force application in a pressurized fluid density measurement, comprising:
- adding a quantity of a liquid sample to a sample cup of a fluid density measurement device;
- securing a sample cover to said sample cup, wherein said sample cover is equipped with a connection component and a sample sealing system comprising a valve system;
- providing the piston assembly of claim 9;
- collecting an additional quantity of the liquid sample in said piston assembly;
- connecting said piston assembly to said connection component, via engagement of a connector of said piston assembly with said connection component, wherein a valve component of said valve system is disposed in an open configuration, and whereby said piston assembly is fluidly connected to an interior portion of said sample cup;
- transferring at least a portion of said additional quantity of said liquid sample contained in said piston assembly to said sample cup, whereby said sample cup is thereby substantially filled with said liquid sample;
- applying force via said piston assembly to pressurize said liquid sample contained in said sample cup, wherein said force is applied with said force applicator, said force is transmitted through said force application assembly from said force applicator, via said force translator, to said piston rod, whereby said force is further transmitted to said liquid sample via said piston rod, and wherein by utilizing said force indicator of said force management system, the force experienced by said liquid sample in said sample cup is quantifiably ascertainable;
- disconnecting said piston assembly from said connection component, while maintaining and not substantially varying said force on said liquid sample in said sample cup, whereby said valve component is actuated, by a pressure in said sample cup, into a closed configuration, thereby fluidly sealing said liquid sample in said sample cup; and
- operating said fluid density measurement device to measure a density of said liquid sample.

18. The method of claim 17, wherein a quantified force indicated by said force indicator is applied to and maintained within said sample cup while operating said fluid density measurement device to measure the density of said liquid sample.

19. The method of claim 17, wherein said force indicator comprises one or more markings disposed on an exterior surface of said force applicator, and wherein a position of said markings on said force indicator in relation to a position of said force application assembly indicates the quantity of force being applied by said force applicator.

20. The method of claim 17, comprising a force-actuated sacrificial component, and whereby a force equal to or greater than to the force required to actuate said force-actuated sacrificial component is applied to said liquid sample in said sample cup.

* * * * *